US011308337B2

United States Patent
Horinaga et al.

(10) Patent No.: US 11,308,337 B2
(45) Date of Patent: Apr. 19, 2022

(54) IMAGE CAPTURING DEVICE

(71) Applicant: Hitachi Automotive Systems, Ltd., Hitachinaka (JP)

(72) Inventors: Maho Horinaga, Hitachinaka (JP); Naoya Tada, Hitachinaka (JP); Yuji Otsuka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/970,399

(22) PCT Filed: Feb. 4, 2019

(86) PCT No.: PCT/JP2019/003779
§ 371 (c)(1),
(2) Date: Aug. 17, 2020

(87) PCT Pub. No.: WO2019/163493
PCT Pub. Date: Aug. 29, 2019

(65) Prior Publication Data
US 2021/0117698 A1    Apr. 22, 2021

(30) Foreign Application Priority Data

Feb. 20, 2018    (JP) .............................. JP2018-028258

(51) Int. Cl.
*H04N 7/18*       (2006.01)
*G06K 9/00*       (2022.01)
*B62D 15/02*     (2006.01)

(52) U.S. Cl.
CPC ....... *G06K 9/00798* (2013.01); *B62D 15/021* (2013.01); *B62D 15/025* (2013.01); *H04N 7/18* (2013.01)

(58) Field of Classification Search
CPC .............. G06K 9/00798; B62D 15/021; B62D 15/025; B62D 1/28; H04N 7/18; H04N 7/183; B60W 30/12; G06T 7/00
(Continued)

(56) References Cited

U.S. PATENT DOCUMENTS

| 2014/0037142 A1* | 2/2014 | Bhanu | G06K 9/00785 382/103 |
| 2015/0259006 A1* | 9/2015 | Inoue | B62D 15/025 701/41 |

(Continued)

FOREIGN PATENT DOCUMENTS

| JP | 11-232467 A | 8/1999 | |
| JP | 11232467 A * | 8/1999 | ............. G60R 21/00 |

(Continued)

OTHER PUBLICATIONS

Mitsuo et al, English Translation of Japanese documents JP2002312797A (Year: 2001).*

(Continued)

*Primary Examiner* — Shan E Elahi
(74) *Attorney, Agent, or Firm* — Crowell & Moring LLP

(57) ABSTRACT

An image capturing device that detects a change in lane width for a vehicle without using information on an adjacent lane is mounted in the vehicle and includes a first camera which captures a first image and a control device which recognizes, in the first image, first and second compartment line L1 and L2 that regulate lanes. The control device determines the presence or absence of a change in lane width on the basis of relationships among the widths of the first compartment line L1 at two points PV1, PV2 at which the distances from a vehicle on the first image are different, the widths of the second compartment line L2 at the two points PV1, PV2 on the first image, and the distances between the (Continued)

first compartment line L1 and the second compartment line L2 at the two points PV1, PV2 on the first image.

9 Claims, 9 Drawing Sheets

(58) Field of Classification Search
USPC ........................................................ 348/148
See application file for complete search history.

(56) References Cited

U.S. PATENT DOCUMENTS

| | | | | |
|---|---|---|---|---|
| 2016/0071415 | A1* | 3/2016 | Maeda | B60R 1/00 348/148 |
| 2016/0146618 | A1* | 5/2016 | Caveney | B60W 50/14 701/25 |
| 2017/0177952 | A1* | 6/2017 | Nakamura | B60R 11/04 |
| 2018/0178790 | A1* | 6/2018 | Oguri | B60W 50/14 |
| 2018/0181132 | A1* | 6/2018 | Kunihiro | G05D 1/0212 |
| 2019/0184990 | A1* | 6/2019 | Lee | G01C 21/3476 |
| 2019/0251845 | A1* | 8/2019 | Kosaka | G08G 1/16 |

FOREIGN PATENT DOCUMENTS

| | | | | |
|---|---|---|---|---|
| JP | 2002-312797 | A | | 10/2002 |
| JP | 2002312797 | A * | 10/2002 | ............ G06T 7/60 |
| JP | 2003-83742 | A | | 3/2003 |
| JP | 2008-33807 | A | | 2/2008 |
| JP | 2017-123009 | A | | 7/2017 |

OTHER PUBLICATIONS

Keiichi et al, English Translation of Japanese documents JP11232467A (Year: 1998).*

International Search Report (PCT/ISA/210) issued in PCT Application No. PCT/JP2019/003779 dated May 28, 2019 with English translation (five pages).

Japanese-language Written Opinion (PCT/ISA/237) issued in PCT Application No. PCT/JP2019/003779 dated May 28, 2019 (seven pages).

* cited by examiner

IMAGE CAPTURING DEVICE

TECHNICAL FIELD

The present invention relates to a technique for detecting a change in lane width on the basis of an image captured by a camera mounted in a vehicle.

BACKGROUND ART

Conventionally, there is known a technique for analyzing an image captured by a camera mounted in a vehicle (own vehicle) to detect positions of compartment lines (white lines) that regulate a lane and estimate a change in width of the lane (own lane) in which the own vehicle travels.

PTL 1 discloses a technique for detecting a branch lane existing in a traveling direction of an own vehicle on an own lane based on a difference in change tendency between a width of an own lane (lane width for the own vehicle) in which the own vehicle travels and a width of an adjacent lane (adjacent lane width) adjacent to the own lane.

CITATION LIST

Patent Literature

PTL 1: JP 2017-123009 A

SUMMARY OF INVENTION

Technical Problem

The above technique of PTL 1 detects the branch lane by detecting the lane width for the own vehicle based on a distance between left and right compartment lines that compart the own lane and detecting the adjacent lane width based on a distance between left and right lanes that compart the adjacent lane. In other words, information on both the lane width for the own vehicle and the adjacent lane width is required to detect the branch lane. Therefore, it is not possible to determine the presence or absence of the branch lane (that is, whether there is a change in lane width for the own vehicle) when it is difficult to detect the adjacent lane width (for example, when there is no adjacent lane or when compartment lines of an adjacent lane are not reflected on an image captured by a camera).

An object of the present invention is to provide an image capturing device that can detect a change in lane width for an own vehicle without using information on an adjacent lane.

Solution to Problem

The present invention provides an image capturing device which is mounted in a vehicle and is provided with: a first camera which captures a first image; and a control device which recognizes a first compartment line and a second compartment line that regulate a lane in the first image, in which the control device is provided with a lane width determination unit which determines presence or absence of a change in width of the lane on the basis of relationships among widths of the first compartment line at two points on the first image at which distances from the vehicle are different, widths of the second compartment line at the two points on the first image, and distances between the first compartment line and the second compartment line at the two points on the first image.

Advantageous Effects of Invention

According to the present invention, it is possible to detect the change in lane width for the own vehicle without using the information on the adjacent lane.

DESCRIPTION OF EMBODIMENTS

Hereinafter, embodiments of the present invention will be described with reference to the drawings.

First Embodiment

Figure 1:
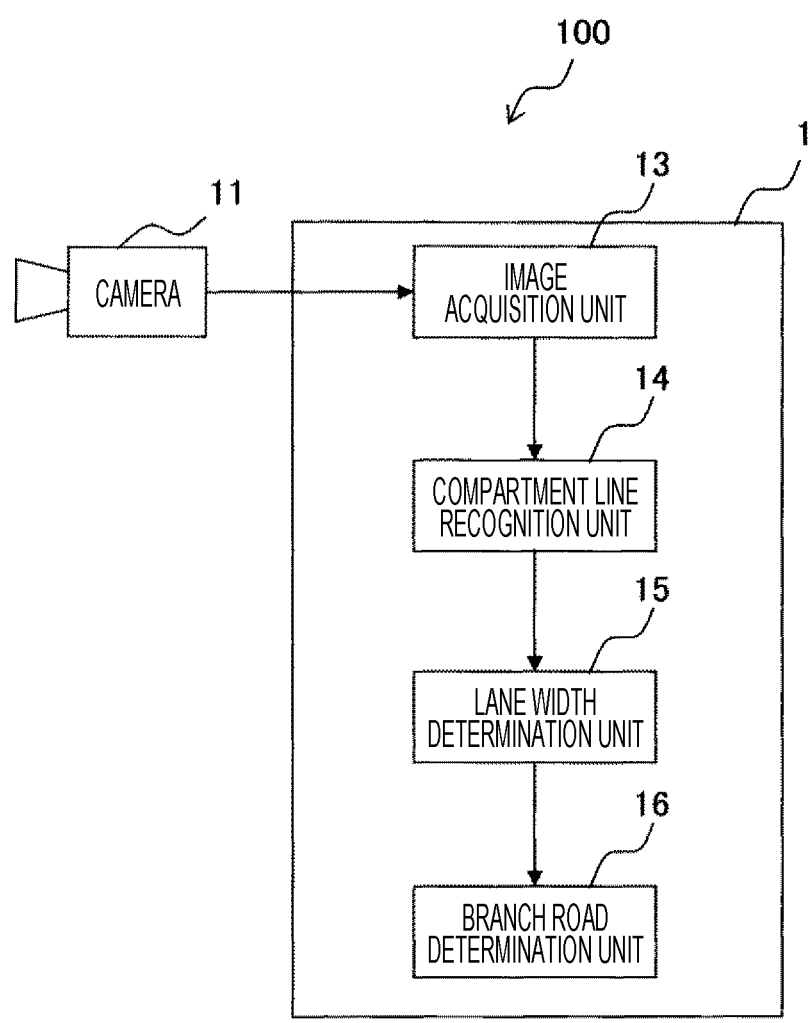
FIG. 1 is a block diagram illustrating an overall configuration of an image capturing device.

FIG. 1 is a schematic configuration diagram illustrating an overall configuration of an image capturing device 100 according to an embodiment of the present invention. The image capturing device 100 in this drawing includes: a first camera 11 provided on the indoor side above a windshield of a vehicle (sometimes referred to as an own vehicle); and a control device 1 which processes an image (captured image) captured by the first camera 11.

The first camera 11 is installed toward the front of the vehicle, and periodically captures images of a predetermined area regulated by a focal length of a lens to acquire time-series images. In the present document, an image captured by the first camera 11 is sometimes referred to as a first image.

The control device 1 is a computer (for example, a microcomputer), and includes, for example, each of an input unit, a central processing unit (CPU or MPU) which is a processor, a read-only memory (ROM) and a random-access memory (RAM) which are storage devices, and an output unit. Among these, the input unit converts various types of information input to the control device 1 such that the CPU can perform calculation. The ROM is a recording medium in which a control program that executes arithmetic processing to be described later appropriately and various types of information required to execute the arithmetic processing are stored, and the CPU performs predetermined arithmetic processing on signals input from the input unit, the ROM, and the RAM according to the control program stored in the ROM. The output unit outputs a command for controlling an output target, information to be used by the output target, and the like. Note that the storage device is not limited to the above-described semiconductor memory such as the ROM and the RAM, but can be replaced with a magnetic storage device such as a hard disk drive.

The control device 1 is a computer that executes external world recognition processing including object detection on the basis of the image captured by the first camera 11, and includes an image acquisition unit 13, a compartment line recognition unit 14, a lane width determination unit 15, and a branch road determination unit 16.

Note that the control device 1 of FIG. 1 may be constituted by a plurality of computers.

The image acquisition unit 13 controls the first camera 11 to execute a process of periodically setting an exposure time (shutter speed) and capturing an image to acquire a time series of color images and storing these images in the control device 1. The color image is defined by an RGB color model, and a color of each pixel constituting the color image is defined by a combination of brightness of red (R), green (G), and blue (B). In the present embodiment, the brightness of each of R, G, and B is expressed by an integer value from 0 to 255 (that is, 256 gradations), and a color of each pixel is defined by a combination of three values (an R value, a G value, a B value).

The compartment line recognition unit 14 is a part that executes a process of recognizing left and right compartment lines (white lines) that regulate an own lane (a lane in which the own vehicle travels) in the image captured by the first camera 11. Since white line recognition processing is known, the description thereof will be omitted. The compartment line recognition unit 14 can recognize a white line, recognized at a position closest to the own vehicle on the left side of the own vehicle, as a left-side compartment line (left compartment line) L1 (see FIG. 3) that regulates the own lane, and recognize a white line, recognized at a position closest to the own vehicle on the right side of the own vehicle, as a right-side compartment line (right compartment line) L2 (see FIG. 3) that regulates the own lane.

Then, a space surrounded by the left compartment line and the right compartment line thus recognized can be recognized as the own lane. When a compartment line to be recognized is not a solid line such as a broken line and an unclear blur line, the compartment line recognition unit 14 can also perform approximation processing to the solid line. Note that the left and right compartment lines of the own lane are sometimes referred to as a first compartment line and a second compartment line in the present document. Although the left compartment line is referred to as the first compartment line hereinafter, but the right compartment line may be referred to as the first compartment line.

The lane width determination unit 15 executes a process of obtaining each of a compartment line width and a lane width for the own vehicle from the left and right compartment lines L1 and L2 of the own lane recognized by the compartment line recognition unit 14 and determining the presence or absence of a change in width of the own lane. Specifically, the process of determining the presence or absence of the change in width of the own lane at two points PV1 and PV2 on the basis of relationships among widths of the left compartment line (first compartment line) L1 at the two points PV1 and PV2 (see FIG. 3) at which distances from the own vehicle are different on the image (first image) captured by the first camera 11, widths of the right compartment line (second compartment line) L2 at the two points PV1 and PV2 on the first image, and distances (that is, lane widths for the own vehicle) between the first compartment line L1 and the second compartment line L2 at the two points PV1 and PV2 on the first image. In the present embodiment, the presence or absence of the change in width of the own lane at the two points PV1 and PV2 is determined, and the lane width for the own vehicle is considered to be constant if there is no change in lane width for the own vehicle at the two points, and the lane width for the own vehicle is considered not to be constant if there is the change in lane width for the own vehicle at the two points.

The two points PV1 and PV2, which serve as reference points to obtain the compartment line width and the lane width for the own vehicle can be set at arbitrary positions from the own vehicle. In the present embodiment, one closer to the own vehicle is set as PV1 and the farther one is set as PV2. Then, a first straight line V1 and a second straight line V2, which are two straight lines that pass through the two points PV1 and PV2 and are parallel to each other, are set on the image (first image) captured by the first camera 11. At this time, the width of the first compartment line L1, the width of the second compartment line L2, and the width of the own lane (the distance between the first compartment line L1 and the second compartment line L2) at the point PV1 close to the own vehicle on the first image are the width of the first compartment line L1, the width of the second compartment line L2, and the width of the own lane on the first straight line V1.

On the other hand, the width of the first compartment line L1, the width of the second compartment line L2, and the width of the own lane (the distance between the first compartment line L1 and the second compartment line L2) at the point PV2 far from the own vehicle on the first image are the width of the first compartment line L1, the width of the second compartment line L2, and the width of the own lane on the second straight line V2. Note that the two straight lines V1 and V2 parallel to each other are regulated after setting the two points PV1 and PV2 in the present embodiment, but it is also possible to set two straight lines V1 and V2 parallel to each other at a predetermined distance from the own vehicle without setting the two points PV1 and PV2.

Figure 2:
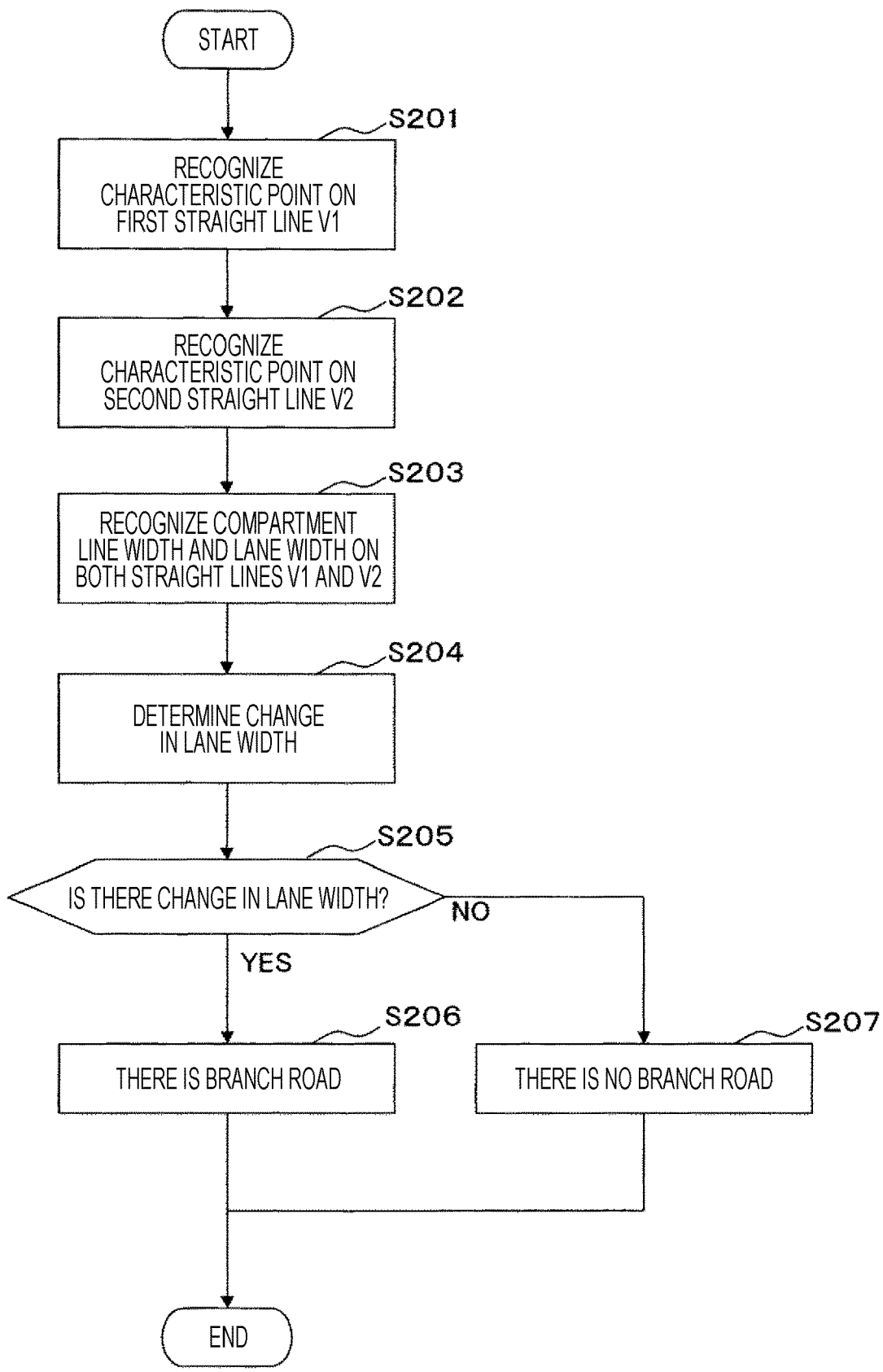
FIG. 2 is a flowchart illustrating a processing procedure for lane width recognition.
Figure 3:
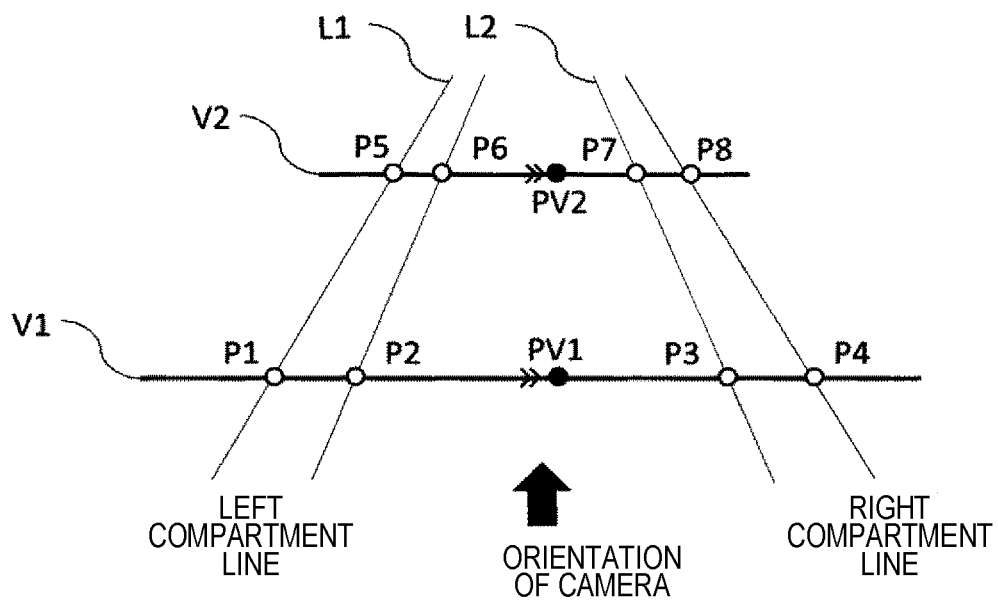
FIG. 3 is a schematic view of characteristic point detection of a compartment line.

Next, a flow of processing of the control device 1 will be described with reference to FIGS. 2 and 3. FIG. 2 is a flowchart of the processing of the control device 1 according to the first embodiment of the present invention, and FIG. 3 is an explanatory view of points (intersection points of straight lines V1 and V2 and compartment lines L1 and L2) P1 to P8 which are used as references at the time of calculating widths of left and right compartment lines and lane widths for the own vehicle in the first embodiment of the present invention.

When the control device 1 starts the processing of FIG. 2, the lane width determination unit 15 detects characteristic points P1, P2, P3, and P4 existing on the intersection points between the left and right compartment lines L1 and L2 recognized by the compartment line recognition unit 14 and the first straight line (V1), which exists near the camera and extends in the horizontal direction on the image, in Step S201. The intersection point between the first straight line V1 and a left end of the first compartment line L1 is P1, the intersection point between the first straight line V1 and a right end of the first compartment line L1 is P2, the intersection point between the first straight line V1 and a left end of the second compartment line L2 is P3, and the intersection point between the first straight line V1 and a right end of the second compartment line L2 is P4.

In Step S202, the lane width determination unit 15 detects characteristic points P5, P6, P7, and P8 existing on the intersection points between the left and right compartment lines L1 and L2 recognized by the compartment line recognition unit 14 and the second straight line (V2) which exists far from the camera and extends in the horizontal direction on the image. The intersection point between the second straight line V2 and a left end of the first compartment line L1 is P5, the intersection point between the second straight line V2 and a right end of the first compartment line L1 is P6, the intersection point between the second straight line V2 and a left end of the second compartment line L2 is P7, and the intersection point between the second straight line V2 and a right end of the second compartment line L2 is P8.

Figure 4:
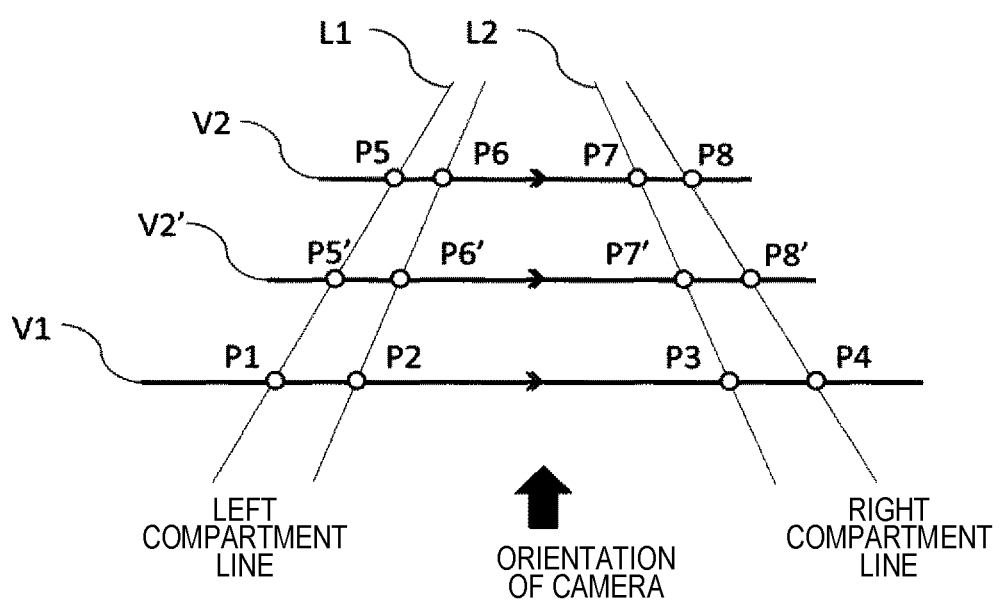
FIG. 4 is a schematic view of lane width recognition according to the present invention.

Note that a distance between the first straight line V1 and the second straight line V2 is preferably separated as far as possible within a range where the two compartment lines L1 and L2 are recognized. However, when all the four points P5 to P8 related to the two compartment lines L1 and L2 have not been recognized on the second straight line V2, for example, it is possible to detect characteristic points P5', P6', P7', and P8' existing on intersection points between a third straight line (V2'), which extends in the horizontal direction similarly to the second straight line V2 and the left and right compartment lines L1, L2, on the side farther from the camera than the second straight line V2 or closer to the camera than the second straight line V2 (however, farther from the camera than the first straight line V1) as illustrated in FIG. 4, and to use these for the subsequent arithmetic processing instead of the points P5 to P8. Note that the case where the four points P5 to P8 have not been recognized on the second straight line V2 has been described as an example here, but it goes without saying that the same processing can be performed on the first straight line V1.

In Step S203, the lane width determination unit 15 calculates left and right compartment line widths and lane widths on the side near the camera and on the side far from the camera (at the two points PV1 and PV2), respectively, on the basis of the characteristic points P1 to P8 detected in Steps S201 and S202. Specifically, a distance from P1 to P2 is calculated as the left compartment line width, a distance from P3 to P4 is calculated as the right compartment line width, and a distance from P2 to P3 is calculated as the lane width based on the characteristic point on the first straight line V1 near the camera in FIG. 3. Further, a distance from P5 to P6 is calculated as the left compartment line width, a distance from P7 to P8 is calculated as the right compartment line width, and a distance from P6 to P7 is calculated as the lane width on the basis of the characteristic points on the straight line V2 far from the camera.

Note that it is also possible to calculate a distance from P1 to P3, a distance from P5 to P7, a distance from P1 to P4, a distance from P5 to P8, a distance from P2 to P4, and a distance from P6 to P8 in Step S203 according to a formula to be used in the subsequent Step S204, in addition to the above distances (the left and right compartment line widths and lane widths at the two points PV1 and PV2). That is, in Step S203, it is possible to calculate a distance between two points arbitrarily selected from among the four characteristic points P1 to P4 related to the first straight line V1 detected in Step S201 and a distance between two points arbitrarily selected from among the four characteristic points P5 to P8 related to the second straight line V2 detected in Step S202.

Note that if the left and right compartment lines have not been recognized on the second straight line V2, a distance from P5' to P6' is calculated as the compartment line width, a distance from P7' to P8' is calculated as the right compartment line width, and a distance from P6' to P7' is calculated as the lane width on the basis of the characteristic points P5', P7', and P8' on the third straight line V3.

In Step S204, the lane width determination unit 15 puts the compartment line widths and the lane widths on the side near the camera and on the side far from the camera calculated in Step S203 into two predetermined formulas among the following Formulas (1) to (7) and determines whether the two formulas are satisfied, thereby determining the presence or absence of a change in lane width for the own vehicle. In the following Formulas (1) to (7), signs of two characteristic points are written consecutively, which indicates a distance between the two points. For example, "P1P2" indicates a "distance between two points P1 and P2", in other words, a "left compartment line width on the first straight line V1". The left side of each formula represents a distance ratio on the first straight line V1, and the right side of each formula represents a distance ratio on the second straight line V2. For each formula, there are a formula in which the denominator on the left side and the numerator on the right side are exchanged and a formula in which the numerator on the left side and the denominator on the right side are exchanged, but these are the same as the original formulas, and thus, are not defined separately.

$$P2P3/P1P2=P6P7/P5P6 \quad (1)$$

$$P1P3/P1P2=P5P7/P5P6 \quad (2)$$

$$P2P3/P1P3=P6P7/P5P7 \quad (3)$$

$$P2P3/P3P4=P6P7/P7P8 \quad (4)$$

$$P2P4/P2P3=P6P8/P6P7 \quad (5)$$

$$P3P4/P2P4=P7P8/P6P8 \quad (6)$$

$$P2P3/P1P4=P6P7/P5P8 \quad (7)$$

The above Formulas (1) to (3) are relational expressions among left compartment line widths and lane widths for the own vehicle on the two straight lines V1 and V2, the above Formulas (4) to (6) are relational expressions among right compartment line widths and lane widths for the own vehicle on the two straight lines V1 and V2, and the above Formula (7) is a relational expression among the left and right compartment line widths and the lane widths for the own vehicle on the two straight lines V1 and V2.

As "combinations of two formulas" set in advance to determine the presence or absence of a change in lane width for the own vehicle, there are [A] a combination of any one of the above Formulas (1) to (3) and any one of the above Formulas (4) to (6), [B] a combination of any one of the above Formulas (1) to (3) and the above Formula (7), and [C] is a combination of any one of the above Formulas (4) to (6) and the above Formula (7), that is, there are a total of fifteen combinations of three types A to B (→C). The combination of the two formulas to be used by the lane width determination unit 15 can be appropriately selected according to a situation, but may be set in advance to one of the fifteen combinations. Further, the order of the combinations to be used may be set in advance.

The lane width determination unit 15 determines whether each of the two formulas in the above "combination of two formulas" is established. In general, the right and left sides of each formula include an error. Thus, in the present embodiment, an allowable value for considering the right side and the left side to be the same is set from experiments, results, or the like, and it is considered that both the sides are the same, that is, the formula is established if a difference between the right side and the left side falls within the allowable value.

When it is considered that the two formulas in the above "combination of two formulas" are both established, the lane width determination unit 15 determines that a similar relationship is established for the left and right compartment line widths and the lane width for the own vehicle on the straight lines V1 and V2, that there is no change in lane width for the own vehicle between the two points PV1 and PV2, and that the lane width for the own vehicle is constant.

When it is determined in Step S205 that there is the change in lane width for the own vehicle in the determination by the lane width determination unit 15 in Step 204, the branch road determination unit 16 proceeds to Step S206 and determines that there is a branch road. At this time, a difference between the lane widths on the side near the camera and the side far from the camera is calculated, a threshold is provided for the difference, and it may be determined that there is a branch lane branching from the own lane if it is possible to confirm the difference equal to or larger than the threshold. On the other hand, when it is determined in Step 204 that there is no change in lane width for the own vehicle, the processing proceeds to Step S207 and it is determined that there is no branch road.

Through the above processing, one cycle of branch determination processing of the control device 1 is completed. The control device 1 waits for a predetermined control cycle, and then, executes a series of processes again from Step S201.

According to the image capturing device 100 of the present embodiment configured as described above, it is possible to determine whether the lane width for the own vehicle is constant using one image captured at an arbitrary timing by determining whether the relational expressions among the left and right compartment line widths and the lane widths for the own vehicle are established on each of the near side and the far side of the first camera 11 Further, as apparent from the above description, the determination can be performed by using only the information on the own lane without using the information on the adjacent lane in the present embodiment. That is, it is possible to detect the change in lane width for the own vehicle without using the information on the adjacent lane according to the present embodiment.

Note that the presence or absence of the change in lane width for the own vehicle is determined from one first image captured at a predetermined time in the above description, but the flowchart of the control device 1 may be configured so as to determine the presence or absence of the change in lane width for the own vehicle by executing the processes of Steps S201 to 204 in each of a plurality of first images at different capturing times and proceed to NO in Step S205 when determining that there is no change in own lane in all of a plurality of determinations. When the control device 1 is configured in this manner, it is possible to improve the accuracy of the determination regarding the presence or absence of the change in lane width for the own vehicle.

Second Embodiment

Figure 5:
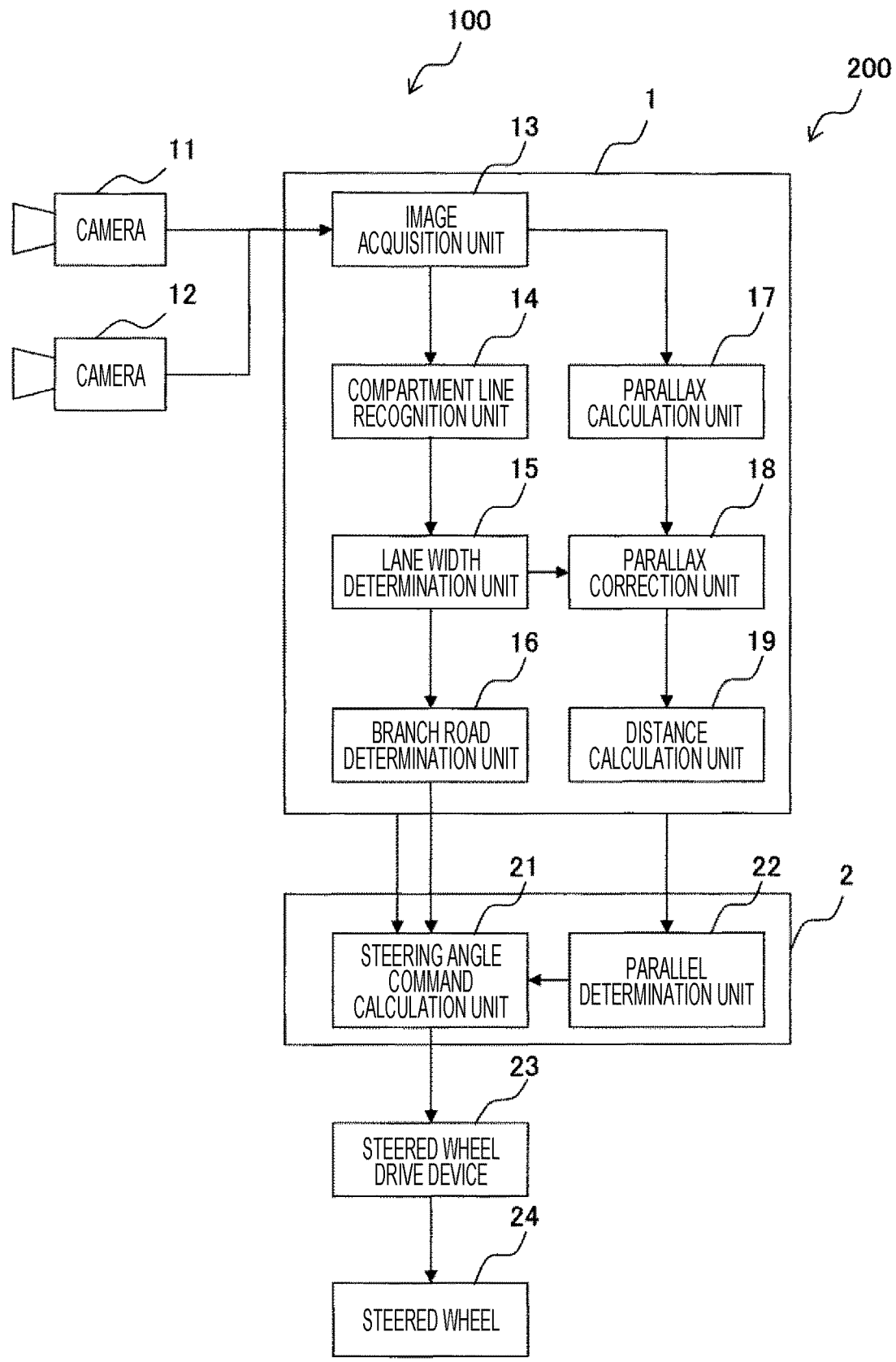
FIG. 5 is a schematic diagram of lane width recognition according to the present invention.

FIG. 5 is a schematic configuration diagram illustrating an overall configuration of a vehicle control system 200 according to a second embodiment of the present invention. The vehicle control system 200 in this drawing includes: a second camera 12 which is provided on the interior side at the upper side of a windshield of a vehicle and constitutes a stereo camera together with the first camera 11; the control device 1 which executes external world recognition processing including object detection based on images captured by the first camera 11 and the second camera 12; a vehicle control device 2 which controls the vehicle based on a result of the external world recognition processing executed by the image capturing device 100; and a steered wheel drive device 23 which drives steered wheels 24 of the vehicle based on a command output from the vehicle control device 2.

The second camera 12 is installed toward the front of the vehicle, and periodically captures images of a predetermined area regulated by a focal length of a lens to acquire time-series images. In the present document, an image captured by the second camera 12 is sometimes referred to as a second image.

The control device 1 of the present embodiment includes: a parallax calculation unit 17 that calculates a parallax based on the first image and the second image; a parallax correction unit 18 that corrects the parallax calculated by the parallax calculation unit 17 based on a position of a vanishing point, which is an intersection point of contour lines of the right compartment line (first compartment line) L1 and the left compartment line (second compartment line) L2, when the lane width determination unit 15 determines that there is no change in width of the own lane; and a distance calculation unit 19 that calculates a distance to an object on the image based on the parallax corrected by the parallax correction unit 18 or the parallax calculated by the parallax calculation unit 17, in addition to the respective units 13 to 16 of the first embodiment.

Similarly to the control device 1, the vehicle control device 2 is a computer (for example, a microcomputer), and includes, for example, each of an input unit, a central processing unit (CPU or MPU) which is a processor, a read-only memory (ROM) and a random-access memory (RAM) which are storage devices, and an output unit.

The vehicle control device 2 includes: a steering angle command calculation unit 21 that calculates a steering angle command to control a steering angle of the steered wheel of the vehicle based on the external environment recognition result obtained by the image capturing device 100; and a parallel determination unit 22 that calculates an extending direction of any one of the left and right compartment lines (first compartment line and second compartment line) L1 and L2 that regulate the own lane and a traveling direction of the vehicle, and determines whether the calculated extending direction and the traveling direction of the own vehicle are parallel.

The steered wheel drive device 23 is, for example, a motor that rotationally drives a steering shaft that mechanically connects a steering wheel and a pinion gear in a rack and pinion type steering system. When the steered wheel drive device 23 drives the steering shaft to rotate based on the steering angle command input from the steering angle command calculation unit 21, the pinion gear rotates, and a rack operates left or right in a vehicle width direction according to the rotating direction of the pinion gear. This operation is transmitted to a knuckle arm via a tie rod, and the steering angle regulated by the steering angle command is applied to the steered wheels (for example, front wheels) 24.

Figure 6:
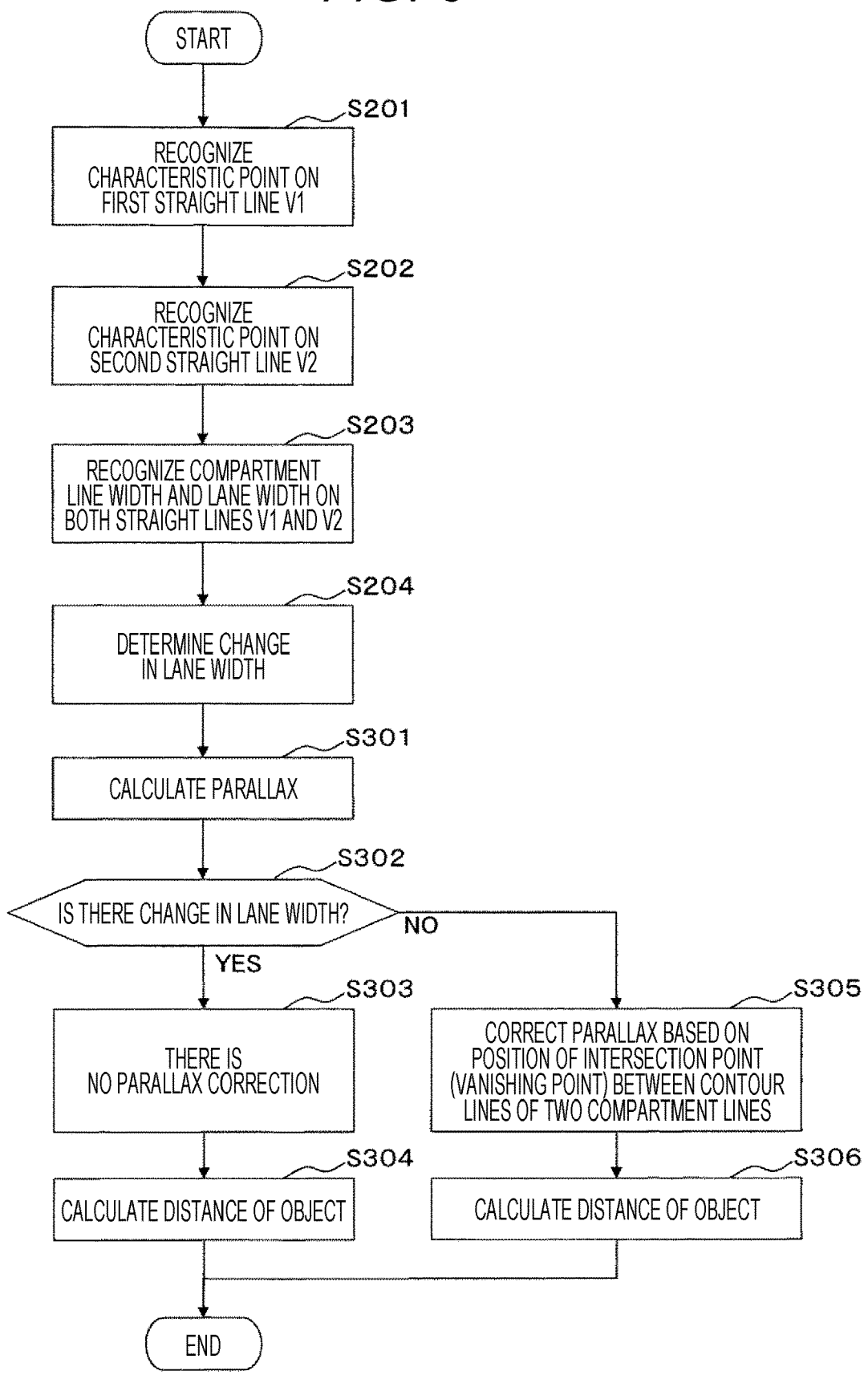
FIG. 6 is a schematic view of the lane width recognition according to the present invention.

Next, a flow of processing of the control device 1 will be described with reference to FIG. 6. FIG. 6 is a flowchart of the processing of the control device 1 according to the second embodiment of the present invention. Note that the same processes as those in FIG. 2 will be denoted by the same reference signs in FIG. 6, and the description thereof will be omitted as appropriate.

When Step S204 is completed, the parallax calculation unit 17 calculates the parallax by stereo matching based on the pair of images (first image and second image) obtained by the first camera 11 and the second camera 12 in Step S301.

In Step S302, the parallax correction unit 18 proceeds to Step S303 when it is determined that there is a change in lane width for the own vehicle in the determination performed by the lane width determination unit 15 in Step 204. On the other hand, the processing proceeds to Step S305 when it is determined that there is no change in lane width for the own vehicle in the determination in Step 204.

In Step S303, the parallax correction unit 18 determines that it is not a situation in which parallax correction using information of the compartment lines parallel to each other (parallax correction processing of Step S305) needs to be executed, and proceeds to Step S304 without performing the parallax correction. In Step S304, the distance calculation unit 19 calculates the distance to the object on the image based on the parallax calculated by the parallax calculation unit 17.

Figure 7:
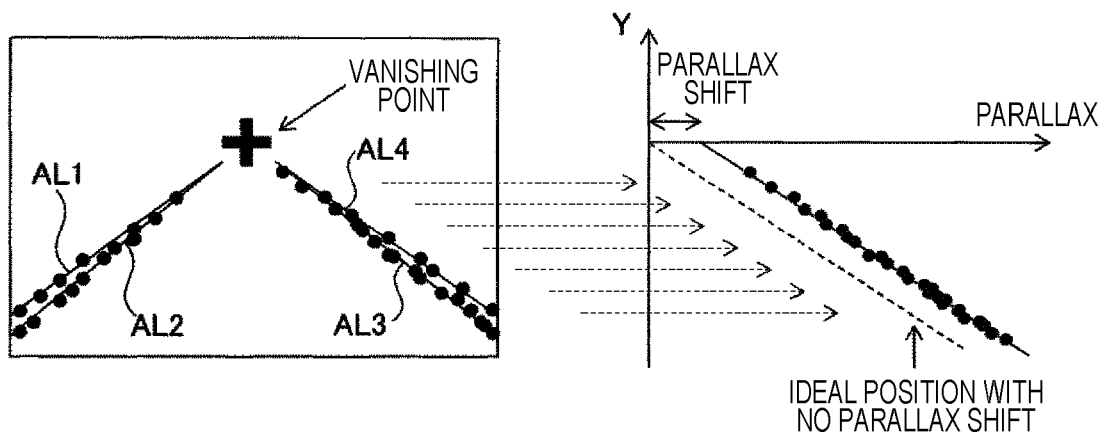
FIG. 7 is a schematic view of lane width recognition according to the present invention.

On the other hand, the parallax correction unit 18 considers that the left and right compartment lines L1 and L2 that regulate the own lane are parallel to each other and executes the parallax correction processing in Step S305. Specifically, the following processing is executed. First, as illustrated in FIG. 7, the parallax correction unit 18 extracts a plurality of points (edge pixels) forming edges of the left and right compartment lines L1 and L2 based on any one of the pair of captured images, which have been used at the time of calculating the parallax, and detects four approximate straight lines AL1, AL2, AL3, and AL4 that are contour lines of the left and right compartment lines L1 and L2. Next, a position of a vanishing point which is an intersection point of the four contour lines is calculated, and a parallax at the position of the vanishing point is acquired. The parallax at the vanishing point is essentially zero, but the correction is necessary when the parallax at the vanishing point regulated by the four approximate straight lines AL1, AL2, AL3, and AL4 is not zero. The parallax calculated by the parallax calculation unit 17 is corrected such that the parallax at the vanishing point becomes zero.

Note that the four approximate straight lines are used in the above description, but the correction may be performed using a vanishing point regulated by any one of the contour lines AL1 and AL2 of the left compartment line and any one of the contour lines AL3 and AL4 of the right compartment line (that is, a total of two approximate straight lines).

Further, a method other than the above one can be used as long as it is known parallax correction that is performed on the condition that the left and right compartment lines L1 and L2 are parallel to each other.

In Step S306, the distance calculation unit 19 calculates the distance to the object on the image based on the parallax corrected by the parallax correction unit 18 in Step S305.

As described above, one cycle of the process of calculating the distance to the predetermined object performed by the control device 1 is completed. The control device 1 waits for a predetermined control cycle, and then, executes a series of processes again from Step S201.

According to the image capturing device 100 of the present embodiment configured as described above, it is possible to easily determine whether a premise is satisfied by using only the information on the own lane without using the information on the adjacent lane when the parallax correction processing is performed with the premise that the left and right compartment lines L1 and L2 are parallel, and the execution of the parallax correction processing is avoided when the whole is not satisfied. Thus, the parallax correction processing can be accurately executed on the basis of the premise. That is, according to the present embodiment, it is possible to detect the change in lane width for the own vehicle without using the information on the adjacent lane, and further, the accuracy of parallax correction is improved.

Third Embodiment

In the present embodiment, a description will be given regarding a process of performing correction without any steering angle in a case where the steering angle of the own vehicle is generated when extending directions of left and right compartment lines L1 and L2 and an orientation (traveling direction) of the own vehicle are parallel. A hardware configuration of the present embodiment is assumed to be the same as that illustrated in FIG. 5, and will not be described.

Figure 8:
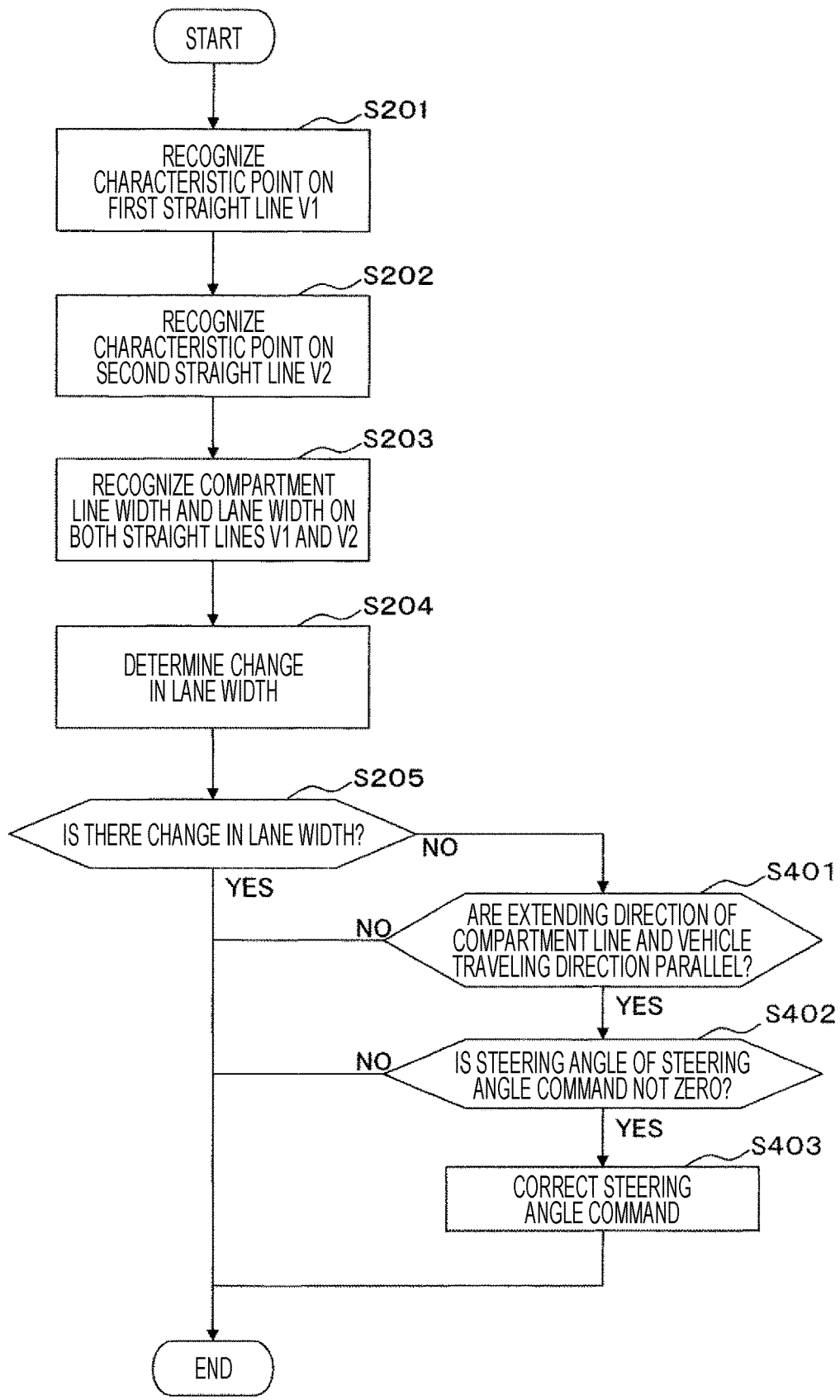
FIG. 8 is a schematic view of lane width recognition according to the present invention.

Here, a flow of processing of the vehicle control system 200 according to the present embodiment will be described with reference to FIG. 8. FIG. 8 is a flowchart of the processing of the control device 1 and the vehicle control device 2 according to a third embodiment of the present invention. Note that the same processes as those in FIG. 2 will be denoted by the same reference signs in FIG. 8, and the description thereof will be omitted as appropriate.

In Step S205, the branch road determination unit 16 ends the processing when it is determined that there is a change in lane width for the own vehicle in the determination performed by the lane width determination unit 15 in Step 204. When the processing is completed, the control device 1 waits for a predetermined control cycle, and then, executes a series of processes again from Step S201. On the other hand, when it is determined that there is no change in lane width for the own vehicle in the determination in Step 204, the lane width for the own vehicle is considered to be constant, and the processing proceeds to Step S401.

In Step S401, the parallel determination unit 22 of the vehicle control device 2 calculates the extending direction of any one of the left compartment line L1 and the right compartment line L2 and the traveling direction of the own vehicle and determines whether the extending direction and the traveling direction of the own vehicle are parallel. A known method can be used for this parallel determination processing, and, for example, it is possible to use a method in which distances from the own vehicle to one of the left and right compartment lines L1 and L2 at different times are calculated, and it is determined that the extending direction of the compartment line and the traveling direction of the own vehicle are parallel when a difference between the calculated distances at the respective times falls within a predetermined threshold. The processing proceeds to Step S402 if it is determined in Step S401 that the extending direction of the compartment line and the traveling direction of the own vehicle are parallel, or is ended if it is determined that both the directions are not parallel.

In Step S402, the steering angle command calculation unit 21 of the vehicle control device 2 determines whether a steering angle regulated by a steering angle command output to the steered wheel drive device 23 is zero, and proceeds to Step S403 if the steering angle is not zero, or ends the processing if the steering angle is zero.

In Step S403, the steering angle command calculation unit 21 corrects the steering angle regulated by the steering angle command in such a state (that is, when the lane width determination unit 15 determines that there is no change in width of the own lane and the parallel determination unit 22 determines that the extending direction of the compartment line and the traveling direction of the own vehicle are parallel) to be zero. As a result, the steering angle command of the steering angle command calculation unit 21 is corrected, so that the control accuracy of the steering angle of the own vehicle is improved.

Fourth Embodiment

Although the presence or absence of a change in lane width for the own vehicle is determined by using the left and right compartment lines in each of the above embodiments, the present embodiment is characterized in that the presence or absence of the change in lane width for the own vehicle is determined by using only one compartment line.

A hardware configuration of the present embodiment is assumed to be the same as that illustrated in FIG. 5, and will not be described. Here, a case where the left compartment line (first compartment line) L1 is used to determine the presence or absence of the change in lane width for the own vehicle will be described, but it goes without saying that the right compartment line L2 may be used.

Figure 10:
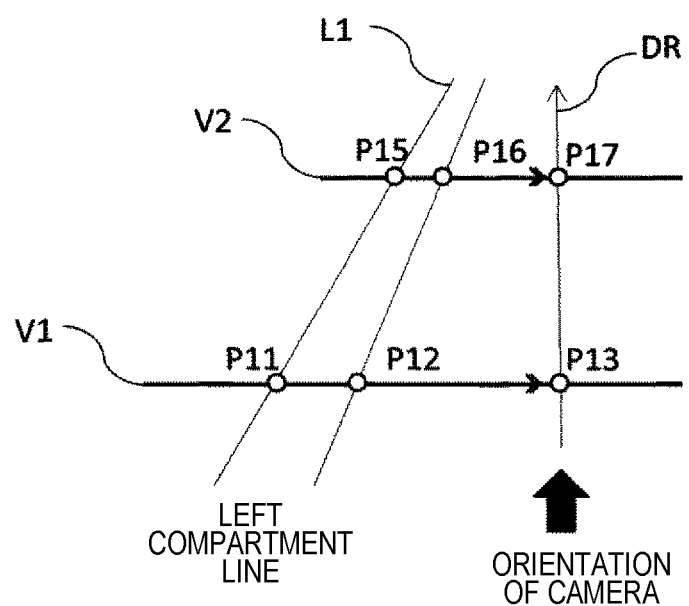
FIG. 10 is a schematic diagram of lane width recognition according to the present invention.

As illustrated in FIG. 10, the lane width determination unit 15 of the present embodiment executes a process of determining the presence or absence of a change in width of an own lane between two points P13 and P17 on the basis of relationships among widths of the left compartment line (first compartment line) L1 at the two points P13 and P17 (see FIG. 10) with different distances on an image (first image) captured by the first camera 11 in a traveling direction DR (in the present embodiment, parallel to the left compartment line) of the own vehicle, and distances between the own vehicle and the first compartment line L1 at the two points P13 and P17 on the first image. In the present embodiment, the presence or absence of the change in width of the own lane at the two points P13 and P17 is determined, and the lane width for the own vehicle is considered to be constant if there is no change in lane width for the own vehicle at the two points, and the lane width for the own vehicle is considered not to be constant if there is the change in lane width for the own vehicle at the two points.

In the present embodiment, the two points P13 and P17, which are reference points to obtain the width of the left compartment line and the distance from the own vehicle to the left compartment line, can be set at arbitrary positions from the own vehicle. In the present embodiment, one closer to the own vehicle is set as P13, and the farther one is set as P17.

Then, a first straight line V1 and a second straight line V2, which are two straight lines that pass through the two points P13 and P17 and are parallel to each other, are set on the image (first image) captured by the first camera 11. At this time, the width of the first compartment line L1 and the distance between the own vehicle and the first compartment line L1 at the point P13 near the own vehicle on the first image are a width of the first compartment line L1 and a distance between the own vehicle and the first compartment line L1 on the first straight line V1. On the other hand, the width of the first compartment line L1 and the distance between the own vehicle and the first compartment line L1 at the point P17 far from the own vehicle on the first image are a width of the first compartment line L1 and a distance between the own vehicle and the first compartment line L1 on the second straight line V2. Note that the two points P13 and P17 are set, and the, the two straight lines V1 and V2 that are parallel to each other are regulated in the present embodiment, but it is also possible to set the two straight lines V1 and V2 parallel to each other at predetermined distances from the own vehicle and set intersection points between the traveling direction DR of the own vehicle parallel to the first compartment line L1 and the two straight lines V1 and V2 as P13 and P17.

Figure 9:
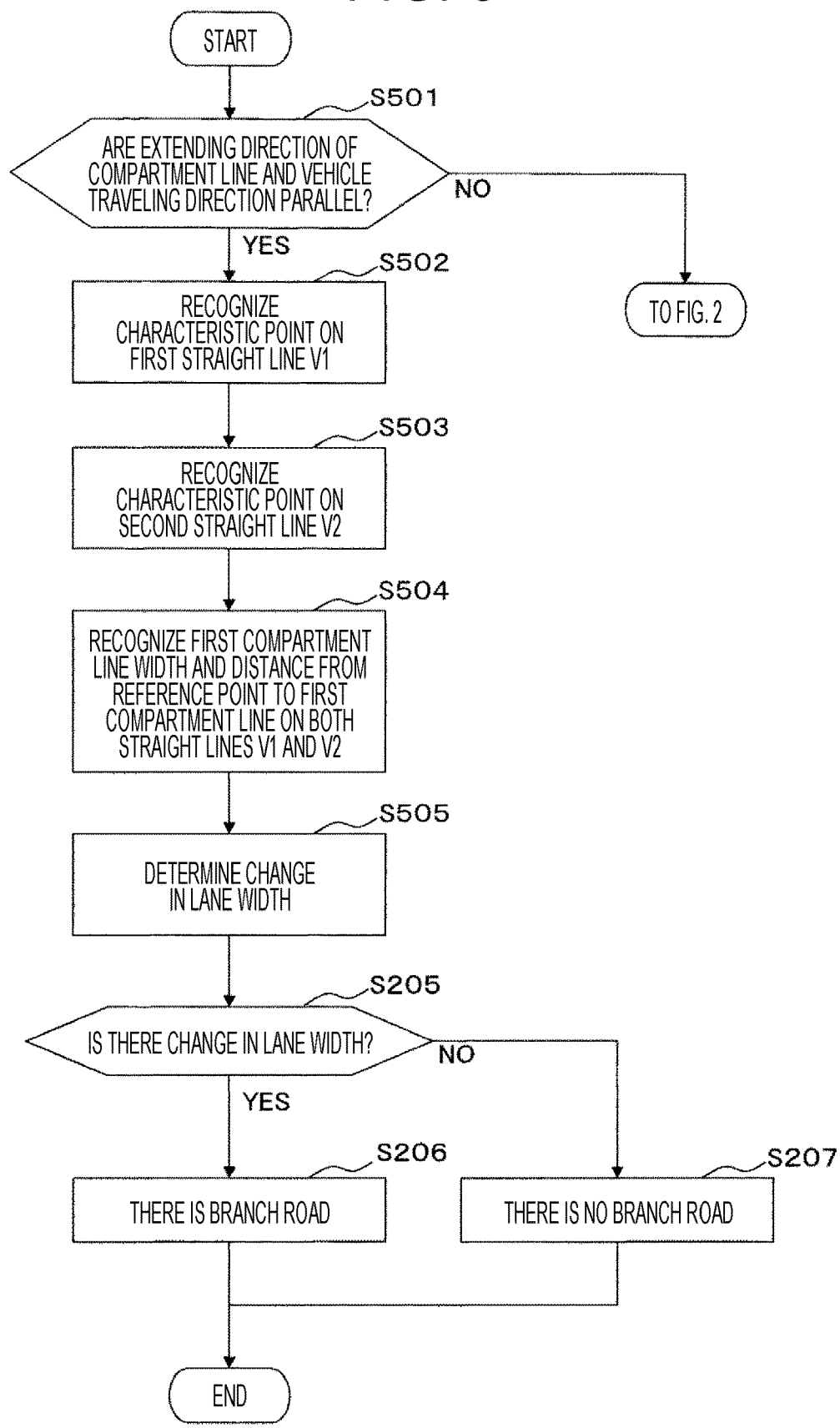
FIG. 9 is a schematic view of lane width recognition according to the present invention.

Next, a flow of processing of the vehicle control system 200 according to the present embodiment will be described with reference to FIG. 9. FIG. 9 is a flowchart of the processing of the control device 1 and the vehicle control device 2 according to a fourth embodiment of the present invention. Note that the same processes as those in FIG. 2 will be denoted by the same reference signs in FIG. 9, and the description thereof will be omitted as appropriate.

When the vehicle control system 200 starts the processing of FIG. 9, the parallel determination unit 22 of the vehicle control device 2 calculates the extending direction of the first compartment line (left compartment line) L1 and the traveling direction of the own vehicle and determines whether the extending direction and the traveling direction of the own vehicle are parallel, that is, whether the own vehicle is traveling along the first compartment line in Step S501. A known method can be used as this parallel determination processing, but the method described in the third embodiment can be used. The processing proceeds to Step S502 if is determined in Step S501 that the extending direction of the compartment line and the traveling direction of the own vehicle are parallel, that is, when the own vehicle is traveling along the first compartment line. If not, the process of FIG. 2 is started and the processing proceeds to Step S201.

In Step S502, the lane width determination unit 15 detects characteristic points P11, P12, and P13 existing on intersection points between the first compartment line (left compartment line) L1 recognized by the compartment line recognition unit 14 and the first straight line (V1) which exists near the camera and extends in the horizontal direction on the image. The intersection point between the first straight line V1 and a left end of the first compartment line L1 is P11, the intersection point between the first straight line V1 and a right end of the first compartment line L1 is P12, and the intersection point between the first straight line V1 and a straight line (which is sometimes referred to as a third straight line) DR indicating the traveling direction of the own vehicle is P13.

In Step S503, the lane width determination unit 15 detects characteristic points P15, P1, and P17 existing on intersection points between the first compartment line (left compartment line) L1 recognized by the compartment line recognition unit 14 and the second straight line (V2) which exists far from the camera and extends in the horizontal direction on the image. The intersection point between the second straight line V2 and a left end of the first compartment line L1 is P15, the intersection point between the second straight line V2 and a right end of the first compartment line L1 is P1, and the intersection point between the second straight line V2 and the straight line DR indicating the traveling direction of the own vehicle is P17.

Note that a distance between the first straight line V1 and the second straight line V2 is preferably separated as far as possible within a range where the two compartment lines L1 and L2 are recognized. However, for example, when none of the three points P15 to P17 related to the left compartment line L1 have been recognized on the second straight line V2, a new straight line may be set similarly to the case illustrated in FIG. 4, and three points P15' to P17' may be set on the straight line to execute the subsequent processing.

In Step S504, the lane width determination unit 15 calculates left compartment line widths and distances between the own vehicle and the left compartment line on the side near the camera and on the side far from the camera (at the two points P13 and P17), respectively, on the basis of the characteristic points P11 to P13 and P15 to P17 detected in Steps S502 and S503. Specifically, a distance from P11 to P12 is calculated as the left compartment line width, and a distance from P12 to P13 is calculated as the distance between the own vehicle and the left compartment line, on the basis the characteristic points on the first straight line V1 near the camera in FIG. 10. Further, a distance from P15 to P16 is calculated as the left compartment line width, and a distance from P16 to P17 is calculated as the distance between the own vehicle and the left compartment line, on the basis of the characteristic points on the straight line V2 far from the camera.

Note that not only the above distances (the left compartment line widths and the distances between the own vehicle and the left compartment line at the two points P13 and P17) but also the distance from P11 to P13 and the distance from P15 to P17 can be calculated in Step S504 according to a formula to be used in the subsequent Step S505. That is, in Step S504, it is possible to calculate a distance between two points arbitrarily selected from among the three characteristic points P11 to P13 related to the first straight line V1 detected in Step S502 and a distance between two points arbitrarily selected from among the three characteristic points P15 to P17 related to the second straight line V2 detected in Step S503.

Note that if the left compartment line has not been recognized on the second straight line V2, a distance from P15' to P1' is calculated as the left compartment line width and a distance from P1' to P17' is calculated as the distance between the own vehicle and the left compartment line on the basis of the characteristic points P15', P1', and P17' on the new straight line.

In Step S505, the lane width determination unit 15 puts the left compartment line widths and the distances to the left compartment line on the side near the camera and the side far from the camera calculated in Step S504 to any one formula set in advance from among the following Formulas (11) to (13), and determines whether the corresponding two formulas are established to determine the presence or absence of a change in lane width for the own vehicle. In the following Formulas (11) to (13), signs of two characteristic points are written consecutively, which indicates a distance between the two points. For example, "P11P12" indicates a "distance between two points P11 and P12", in other words, a "left compartment line width on the first straight line V1". The left side of each formula represents a distance ratio on the first straight line V1, and the right side of each formula represents a distance ratio on the second straight line V2. For each formula, there are a formula in which the denominator on the left side and the numerator on the right side are exchanged and a formula in which the numerator on the left side and the denominator on the right side are exchanged, but these are the same as the original formulas, and thus, are not defined separately.

$$P12P13/P11P12=P16P17/P15P16 \quad (11)$$

$$P11P13/P11P12=P15P17/P15P16 \quad (12)$$

$$P12P13/P11P13=P16P17/P15P17 \quad (13)$$

The above Formulas (11) to (13) are relational expressions among the left compartment line widths and the distances between the own vehicle and the left compartment line on the two straight lines V1 and V2.

The formula to be used by the lane width determination unit 15 can be appropriately selected according to a situation, but may be set in advance to one of the above three formulas. Further, the order of the combinations to be used may be set in advance.

The lane width determination unit 15 determines whether any one of the above three formulas is established. In general, the right and left sides of each formula include an error. Thus, in the present embodiment, an allowable value for considering the right side and the left side to be the same is set from experiments, results, or the like, and it is considered that both the sides are the same, that is, the formula is established if a difference between the right side and the left side falls within the allowable value.

When it is considered that any one of the above three formulas is established, the lane width determination unit 15 determines that a similar relationship is established for the left compartment line widths and the distances between the own vehicle and the left compartment line on the two straight lines V1 and V2, that is, there is no change in lane width for the own vehicle between the two points P13 and P17, and that the lane width for the own vehicle is constant.

When it is determined in Step S205 that there is the change in lane width for the own vehicle in the determination by the lane width determination unit 15 in Step 505 (→S505), the branch road determination unit 16 proceeds to Step S206 and determines that there is a branch road. At this time, a difference between the lane widths on the side near the camera and the side far from the camera is calculated, a threshold is provided for the difference, and it may be determined that there is a branch lane branching from the own lane if it is possible to confirm the difference equal to or larger than the threshold. On the other hand, when it is determined in Step 505 that there is no change in lane width for the own vehicle, the processing proceeds to Step S207 and it is determined that there is no branch road.

Through the above processing, one cycle of branch determination processing of the control device 1 is completed. The control device 1 waits for a predetermined control cycle, and then, executes a series of processes again from Step S501.

According to the vehicle control system 200 of the present embodiment configured as described above, it is possible to determine whether the lane width for the own vehicle is constant using one image captured at an arbitrary timing by determining whether the relational expression between the left compartment line width and the distance between the own vehicle and the left compartment line is established on each of the near side and the far side of the first camera 11.

Further, although being limited to the case where the own vehicle is traveling in parallel with one of the two compartment lines that regulate the own lane, it is possible to determine whether the lane width for the own vehicle is constant by using only the information on the one compartment line in the present embodiment as apparent from the above description. That is, it is possible to detect the change in lane width for the own vehicle without using the information on the adjacent lane according to the present embodiment.

Note that the case where the parallel determination unit is provided in the vehicle control device 2 has been described above, the parallel determination unit 22 may be provided in the control device 1 of the image capturing device 100. In this case, the present embodiment can be implemented only by the image capturing device 100.

The present invention is not limited to the above embodiments, and includes various modifications within a scope not departing from a gist of the present invention. For example, the present invention is not limited to one having all the configurations described in the above embodiments, but also includes one in which some of the configurations are deleted. Further, a part of the configuration according to a certain embodiment can be added to or replaced by the configuration according to another embodiment.

Further, some or all of the respective configurations related to the above control devices 1 and 2 and the functions, execution processes, and the like of the respective configurations may be realized by hardware (for example, by designing a logic for executing each function with an integrated circuit). Further, each configuration related to the above control devices 1 and 2 may be configured as a program (software) that is read and executed by an arithmetic processing device (for example, a CPU) to enable each function related to the configuration of the device to be realized. Information on the program can be stored in, for example, a semiconductor memory (such as a flash memory, and an SSD), a magnetic storage device (such as a hard disk drive), and a recording medium (such as a magnetic disk and an optical disk).

Further, control lines and information lines that are considered to be necessary in the above embodiments have been described in the description of each of the above embodiments, but not all the control lines and information lines related to a product have been described. It may be considered that most of the configurations are practically connected to each other.

REFERENCE SIGNS LIST

1 control device
2 vehicle control device
11 camera (first camera)
12 camera (second camera)
13 image acquisition unit
14 compartment line recognition unit
15 lane width determination unit
16 branch road determination unit
17 parallax calculation unit
18 parallax correction unit
19 distance calculation unit
21 steering angle command calculation unit
22 parallel determination unit
23 steered wheel drive device
24 steered wheel
L1 left compartment line (first compartment line)
L2 right compartment line (second compartment line)
V1 first straight line
V2 second straight line
PV1, PV2 two points with different distances from own vehicle
P13, P17 two points with different distances from own vehicle

The invention claimed is:

1. An image capturing device, which is mounted in a vehicle, comprising:
   a first camera which captures a first image; and
   a control device which recognizes a first compartment line and a second compartment line that regulate a lane in the first image,
   wherein the control device comprises a lane width determination unit which determines presence or absence of a change in width of the lane based on relationships among widths of the first compartment line at two points on the first image at which distances from the vehicle are different, widths of the second compartment line at the two points on the first image, and distances between the first compartment line and the second compartment line at the two points on the first image, and
   wherein, when a first straight line and a second straight line, which are two straight lines that pass through the two points, respectively, and are parallel to each other, are set on the first image,
   a width of the first compartment line, a width of the second compartment line, and a distance between the first compartment line and the second compartment line at one of the two points on the first image are a width of the first compartment line, a width of the second compartment line, and a distance between the first compartment line and the second compartment line on the first straight line, and
   a width of the first compartment line, a width of the second compartment line, and a distance between the first compartment line and the second compartment line at another point of the two points on the first image are a width of the first compartment line, a width of the second compartment line, and a distance between the first compartment line and the second compartment line on the second straight line.

2. The image capturing device according to claim 1, wherein, when a first straight line and a second straight line, which are two straight lines that pass through the two points, respectively, and are parallel to each other, are set on the first image, an intersection point between the first straight line and a left end of the first compartment line is P1, an intersection point between the first straight line and a right end of the first compartment line is P2, an intersection point between the first straight line and a left end of the second compartment line is P3, an intersection point between the first straight line and a right end of the second compartment line is P4, an intersection point between the second straight line and a left end of the first compartment line is P5, an intersection point between the second straight line and a right end of the first compartment line is P6, an intersection point between the second straight line and a left end of the second compartment line is P7, an intersection point between the second straight line and a right end of the second compartment line is P8, and following Formulas (1) to (7) are set, (1) distance between two points P2 and P3/distance between two points P1 and P3=distance between two points P6 and P7/distance between two points P5 and P6

(2) distance between two points P1 and P3/distance between two points P1 and P2=distance between two points P5 and P7/distance between two points P5 and P6

(3) distance between two points P2 and P3/distance between two points P1 and P3=distance between two points P6 and P7/distance between two points P5 and P7

(4) distance between two points P2 and P3/distance between two points P3 and P4=distance between two points P6 and P7/distance between two points P7 and P8

(5) distance between two points P2 and P4/distance between two points P2 and P3=distance between two points P6 and P8/distance between two points P6 and P7

(6) distance between two points P3 and P4/distance between two points P2 and P4=distance between two points P7 and P8/distance between two points P6 and P8

(7) distance between two points P2 and P3/distance between two points P1 and P4=distance between two points P6 and P7/distance between two points P5 and P8, the lane width determination unit determines that there is no change in the width of the lane in a case of considering that any one of the above Formulas (1) to (3) and any one of the above Formulas (4) to (6) are established, a case of considering that any one of the above Formulas (1) to (3) and the above Formula (7) are established, or a case of considering that any one of the above Formulas (4) to (6) and the above Formula (7) are established, and determines that there is the change in the width of the lane in a case other than the above cases.

3. The image capturing device according to claim 1, wherein the lane width determination unit determines whether the width of the lane is constant based on a result of the determination on the presence or absence of the change in the width of the lane.

4. The image capturing device according to claim 1, wherein the control device further includes a branch road determination unit which determines that the lane branches when the lane width determination unit determines that there is the change in the width of the lane.

5. The image capturing device according to claim 1, further comprising a second camera which captures a second image, wherein the control device further includes:
a parallax calculation unit which calculates a parallax based on the first image and the second image;
a parallax correction unit which corrects the parallax calculated by the parallax calculation unit based on a position of a vanishing point, which is an intersection point between contour lines of the first compartment line and the second compartment line, when the lane width determination unit determines that there is no change in the width of the lane; and
a distance calculation unit which calculates a distance to an object based on the parallax corrected by the parallax correction unit.

6. The image capturing device according to claim 1, wherein a case where the lane width determination unit determines that there is no change in the width of the lane is a case where the presence or absence of the change in the width of the lane between the two points is determined based on a plurality of first images obtained at different capturing times, and it is determined that there is no change in the width of the lane in all of a plurality of determinations.

7. The image capturing device according to claim 1, wherein the first compartment line and the second compartment line are parallel.

8. A vehicle control system comprising:
the image capturing device according to claim 1;
a vehicle control device which comprises a steering angle command calculation unit that calculates a steering angle command for control of a steering angle of steered wheels of the vehicle based on an external environment recognition result of the image capturing device; and
a steered wheel drive device which drives the steered wheels of the vehicle based on the steering angle command output from the steering angle command calculation unit,
wherein the vehicle control device further includes a parallel determination unit that calculates an extending direction of one of the first compartment line and the second compartment line and a traveling direction of the vehicle and determines whether the extending direction and the traveling direction of the vehicle are parallel, and
the steering angle command calculation unit corrects a steering angle regulated by the steering angle command to be zero when the steering angle regulated by the steering angle command is not zero in a case where the lane width determination unit determines that there is no change in the width of the lane and the parallel determination unit determines that the extending direction and the traveling direction of the vehicle are parallel.

9. An image capturing device, which is mounted in a vehicle, comprising:
a first camera which captures a first image; and
a control device which recognizes a first compartment line that regulates a lane in the first image,
wherein the control device comprises a lane width determination unit which determines presence or absence of a change in width of the lane based on relationships among widths of the first compartment line at two points on the first image at which distances from the vehicle are different and distances between the vehicle and the first compartment line at the two points when the vehicle travels along the first compartment line, and
wherein, when a first straight line and a second straight line, which are two straight lines that pass through the two points, respectively, and are parallel to each other, are set on the first image, one of intersection points between the first straight line and the first compartment line is P11, another intersection point between the first straight line and the first compartment line is P12, an intersection point between the first straight line and a third straight line indicating the traveling direction of the vehicle is P13, one of intersection points between the second straight line and the first compartment line is P15, another intersection point between the second straight line and the first compartment line is P1, an intersection point between the second straight line and the third straight line is P17, and following Formulas (11) to (13) are set,

(11) distance between two points P12 and P13/distance between two points P11 and P12=distance between two points P16 and P17/distance between two points P15 and P16

(12) distance between two points P11 and P13/distance between two points P11 and P12=distance between two points P15 and P17/distance between two points P15 and P16

(13) distance between two points P12 and P13/distance between two points P11 and P13=distance between two points P16 and P17/distance between two points P15 and P17, the lane width determination unit determines that there is no change in the width of the lane in a case of considering that one of the above Formulas (11) to (13) is established, and determines that there is the change in the width of the lane in another case.

* * * * *